(12) United States Patent
Nomani et al.

(10) Patent No.: US 10,469,543 B2
(45) Date of Patent: *Nov. 5, 2019

(54) RECOVERY FROM A POTENTIAL PROXY CALL SESSION CONTROL FUNCTION (P-CSCF) FAILURE DURING CALL ORIGINATION

(71) Applicant: Verizon Patent and Licensing Inc., Arlington, VA (US)

(72) Inventors: Muhammad Salman Nomani, Somerset, NJ (US); Andrew E. Youtz, Princeton, NJ (US); Jun Yuan, Cranbury, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/964,402

(22) Filed: Apr. 27, 2018

(65) Prior Publication Data

US 2018/0248920 A1 Aug. 30, 2018

Related U.S. Application Data

(63) Continuation of application No. 15/175,276, filed on Jun. 7, 2016, now Pat. No. 9,979,756.

(51) Int. Cl.
| | |
|---|---|
| *H04W 88/18* | (2009.01) |
| *H04L 29/06* | (2006.01) |
| *H04W 76/18* | (2018.01) |
| *H04L 29/14* | (2006.01) |

(52) U.S. Cl.
CPC ........ *H04L 65/1073* (2013.01); *H04L 65/105* (2013.01); *H04L 65/1006* (2013.01); *H04L 65/1016* (2013.01); *H04L 69/40* (2013.01); *H04W 76/18* (2018.02); *H04L 65/1069* (2013.01); *H04W 88/182* (2013.01)

(58) Field of Classification Search
CPC ........... H04L 65/1073; H04L 65/1016; H04W 76/18; H04W 88/182
See application file for complete search history.

(56) References Cited

U.S. PATENT DOCUMENTS

| | | | |
|---|---|---|---|
| 9,706,019 B2* | 7/2017 | Du | H04L 69/40 |
| 2008/0092226 A1* | 4/2008 | Horvath | H04L 63/164 |
| | | | 726/12 |
| 2009/0313376 A1 | 12/2009 | Cedervall et al. | |
| 2015/0282242 A1* | 10/2015 | Merino Vazquez | |
| | | | H04L 65/1073 |
| | | | 370/221 |

* cited by examiner

Primary Examiner — Wei Zhao

(57) ABSTRACT

A user device registers with a proxy-call session control function device (P-CSCF) associated with an Internet protocol (IP) multimedia subsystem (IMS). The user device forwards a request to the P-CSCF requesting a session via the IMS for an IMS call. If a response to the request is not received from the P-CSCF during a time period after forwarding the request, the user device attempts to newly register with the P-CSCF. If the new registration is successful, the user device re-forwards the request to the P-CSCF. Otherwise, if the new registration with the P-CSCF is unsuccessful, the user device registers with a different P-CSCF and forwards the request to the second P-CSCF.

20 Claims, 11 Drawing Sheets

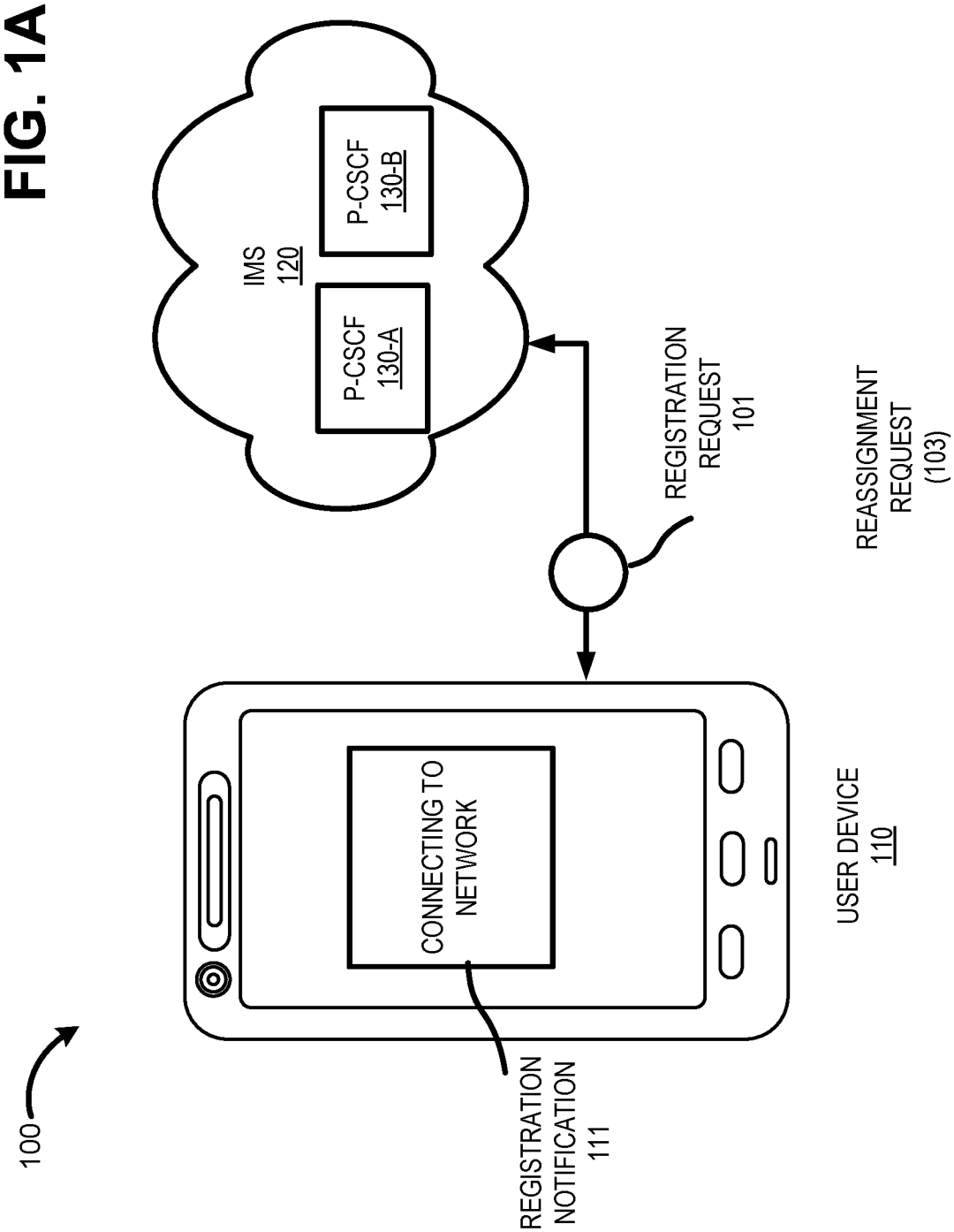

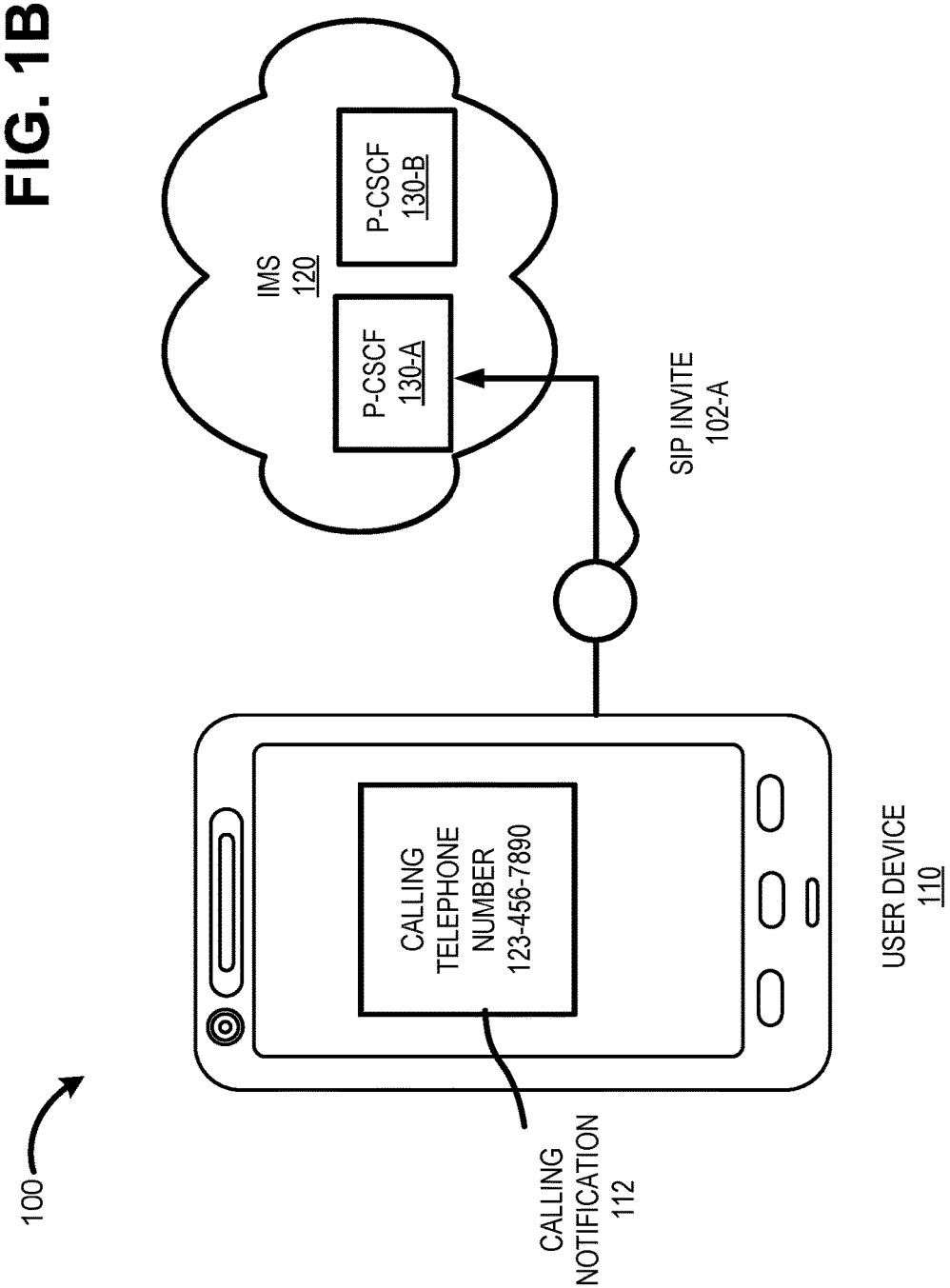

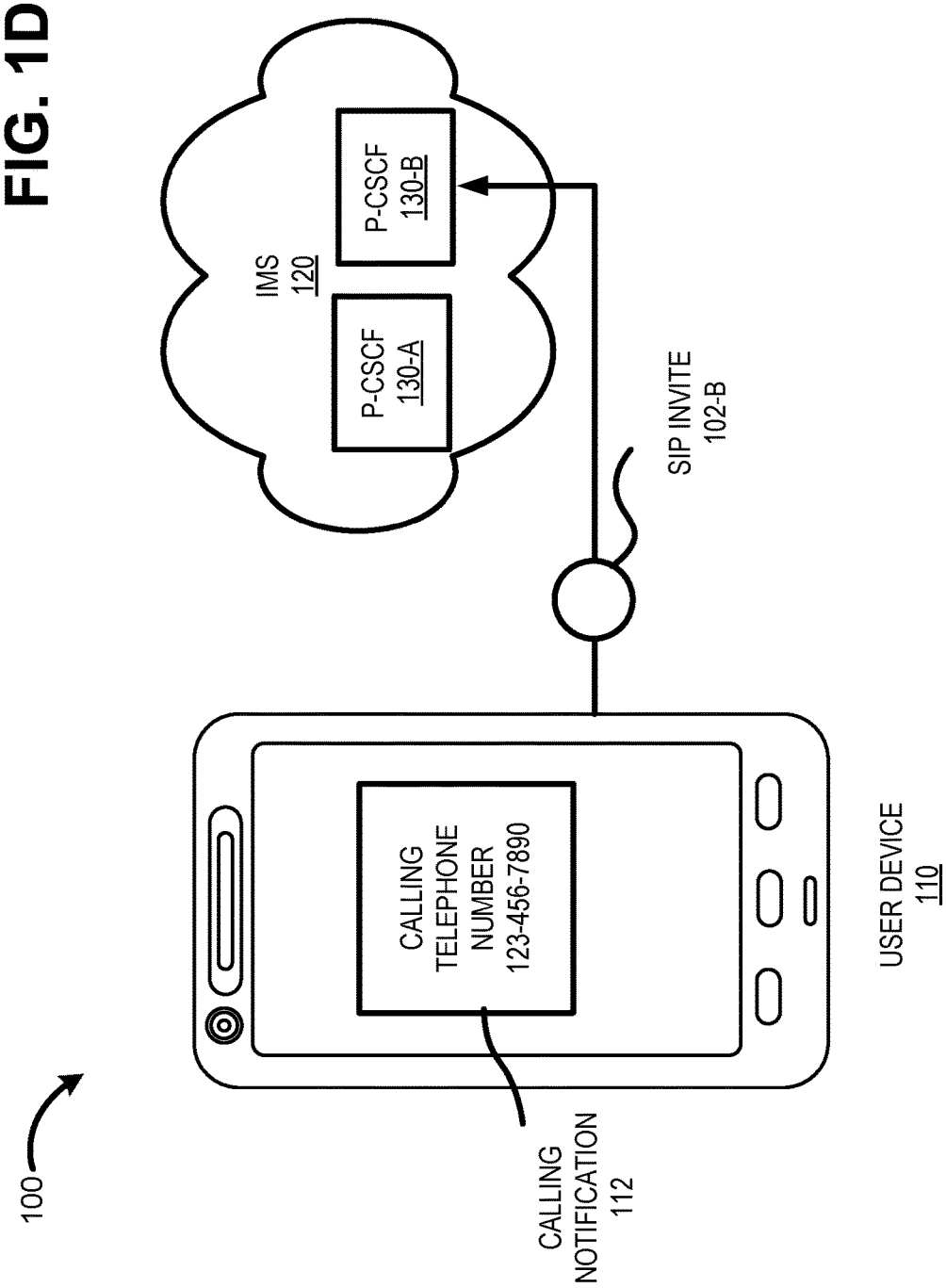

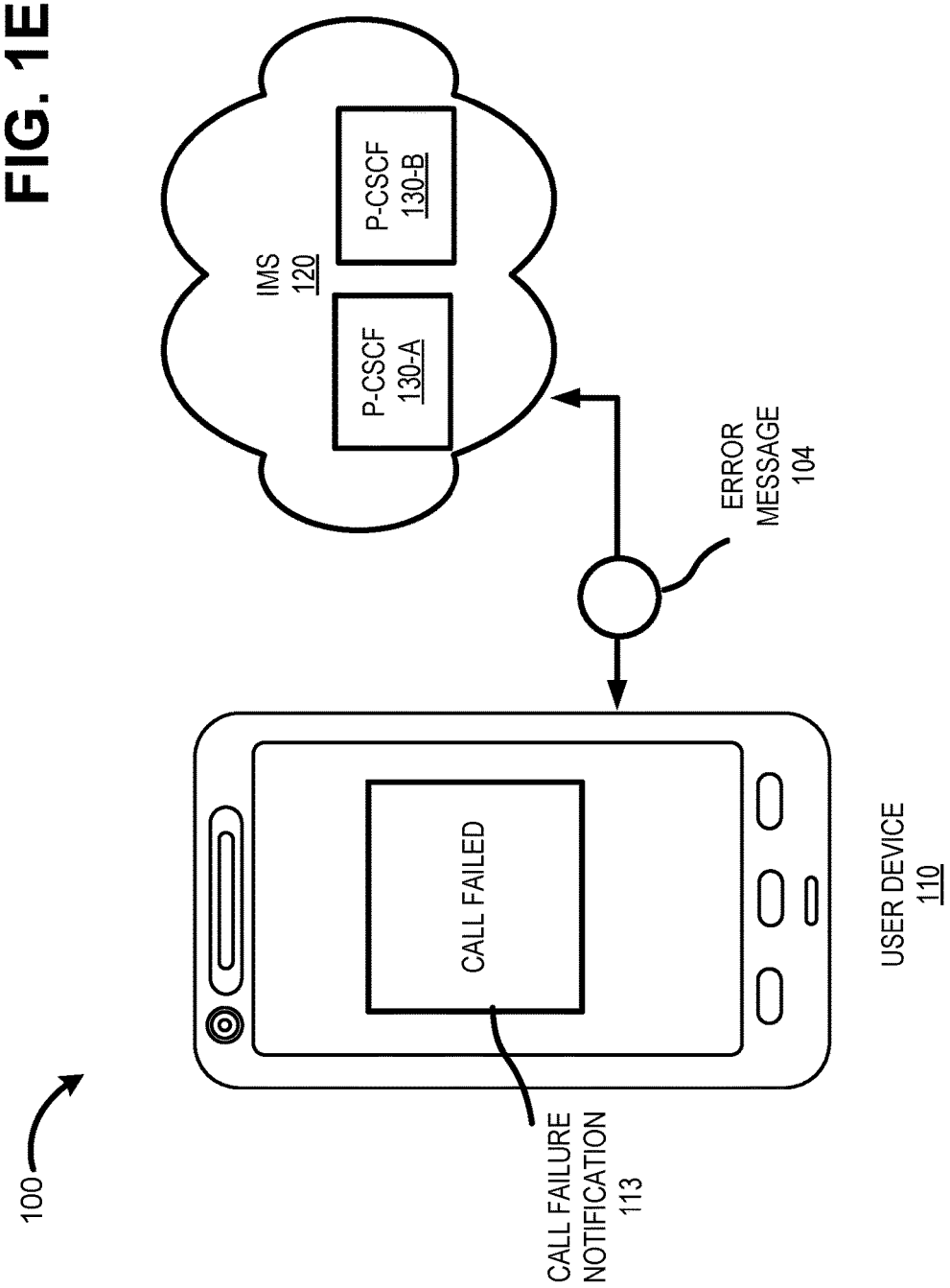

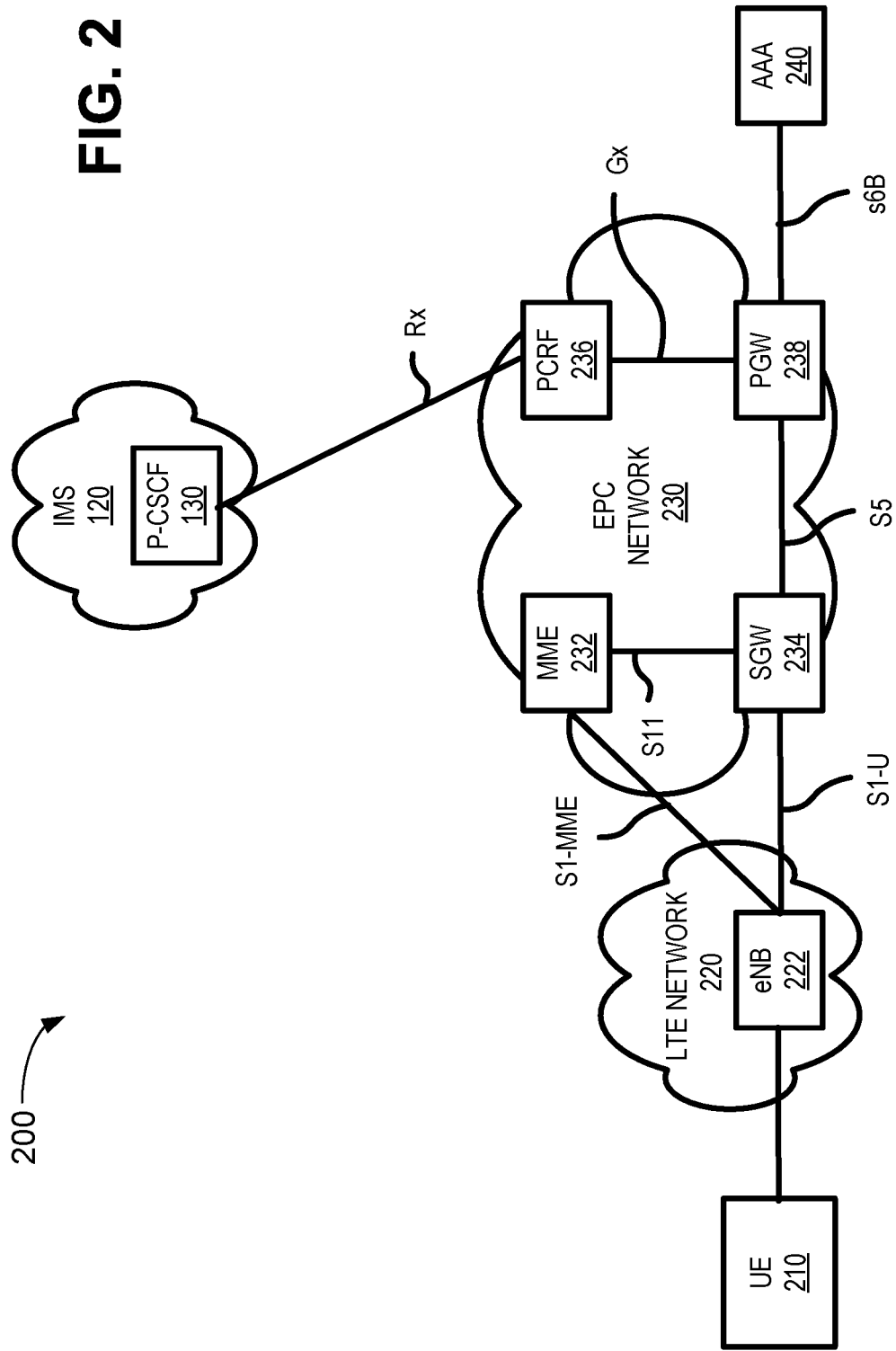

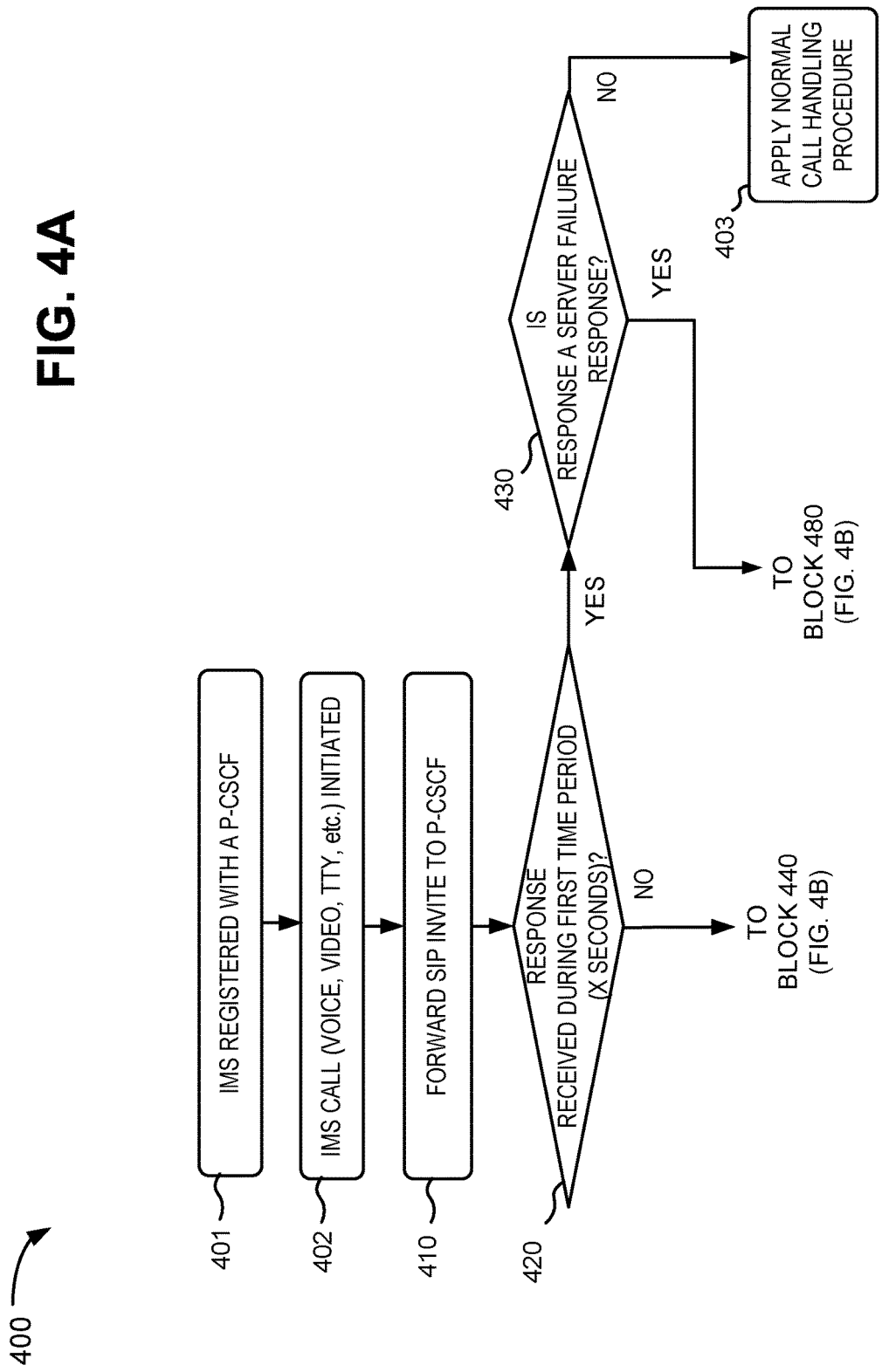

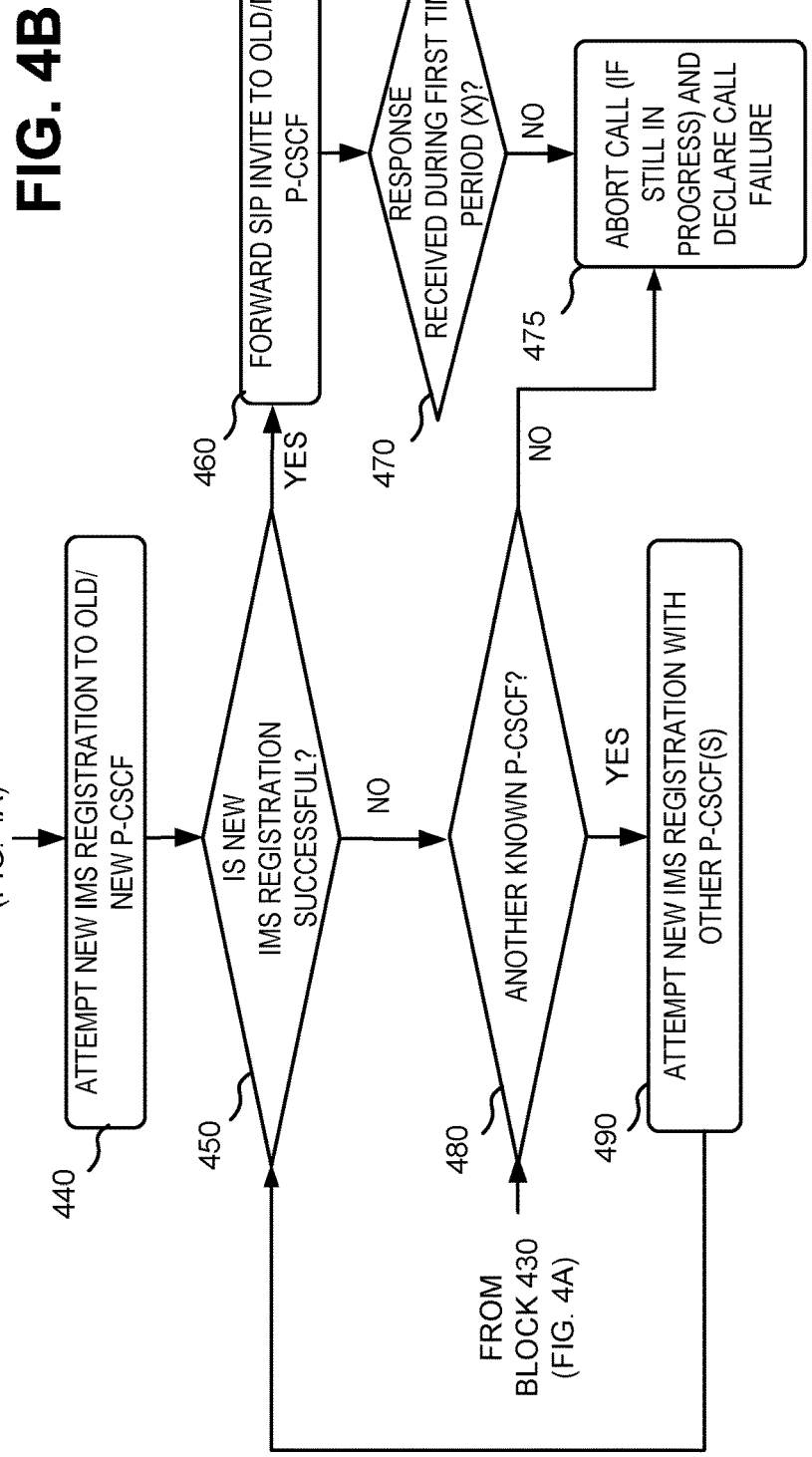

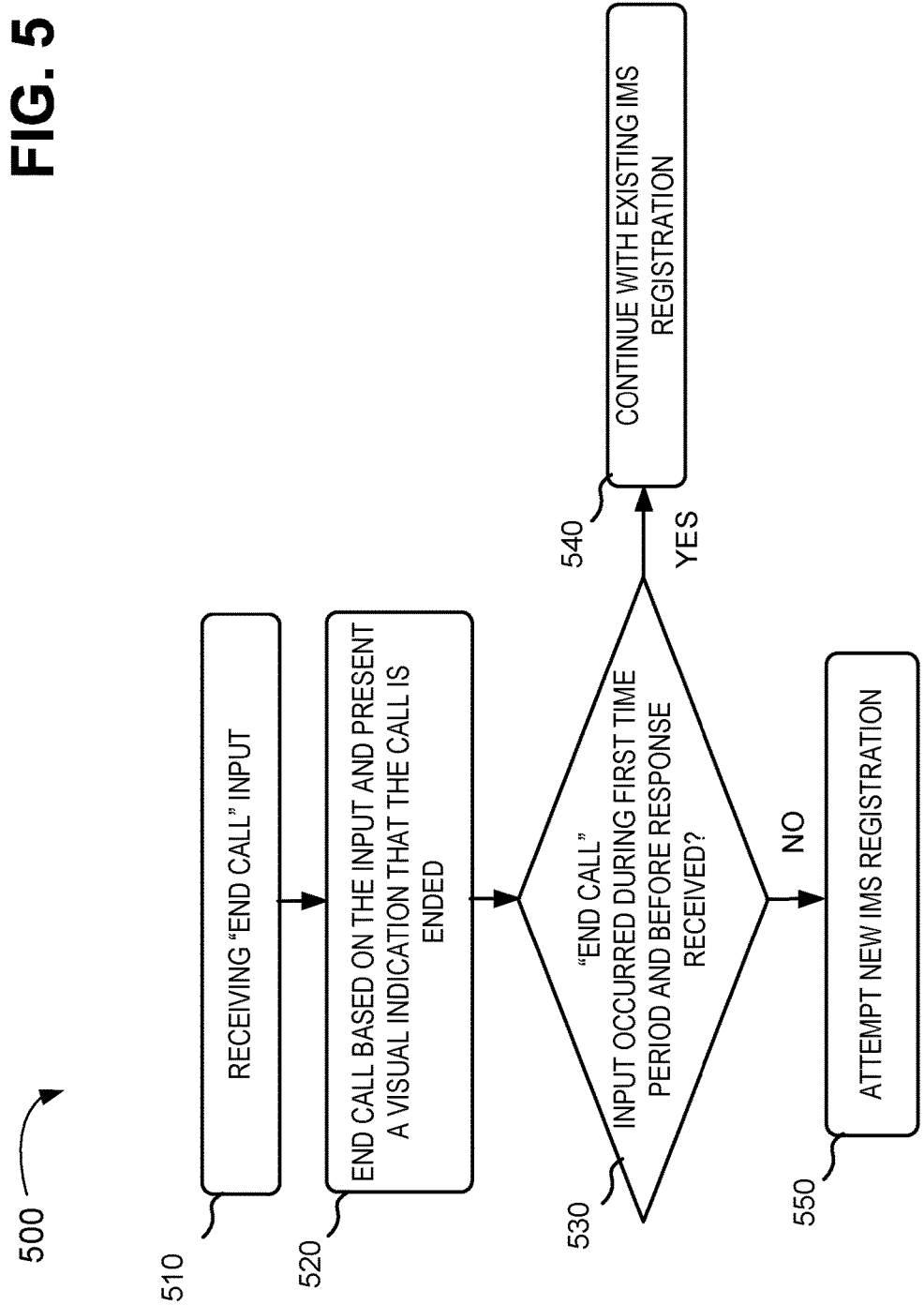

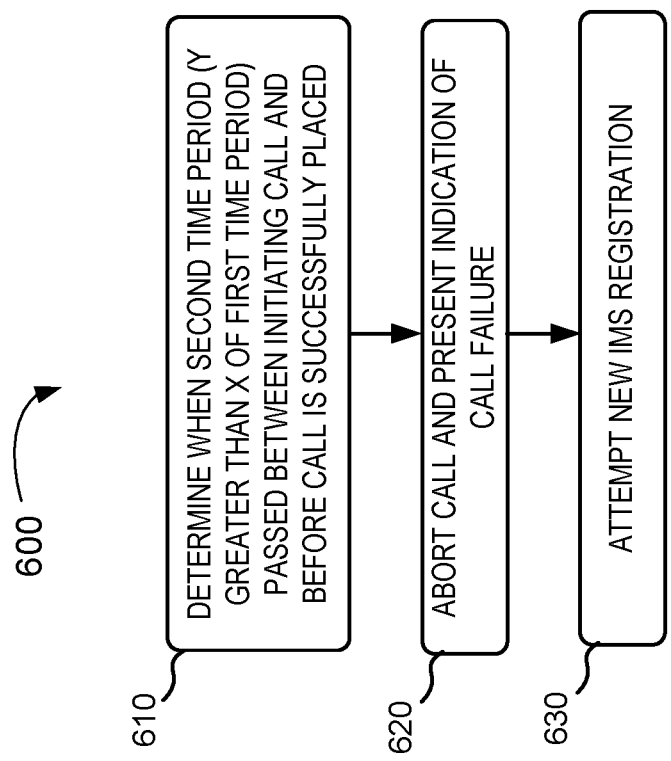

RECOVERY FROM A POTENTIAL PROXY CALL SESSION CONTROL FUNCTION (P-CSCF) FAILURE DURING CALL ORIGINATION

REFERENCE TO RELATED APPLICATION

This patent application is a continuation of U.S. patent application Ser. No. 15/175,276, entitled "RECOVERY FROM A POTENTIAL PROXY CALL SESSION CONTROL FUNCTION (P-CSCF) FAILURE DURING CALL ORIGINATION" and filed on Jun. 7, 2016, which is hereby incorporated herein by reference in its entirety.

BACKGROUND INFORMATION

The Third Generation Partnership Project (3GPP) Technical Specification (TS) describes, a proxy-call session control function device (P-CSCF) as the point of contact for a user equipment (UE), such as a smart phone, to access an Internet protocol (IP) multimedia subsystem (IMS) included in a wireless wide-area network. The UE may access multimedia content via the IMS. For example, the UE may interface with the P-CSCF when exchanging, via the IMS, audio and/or video content associated with a voice over Internet protocol (VoIP), a teletypewriter (TTY), a video, or other IMS call. A component of the IMS, such as a packet gateway (PGW), may maintain a list of active P-CSCFs, and the PGW may assign one of the active P-CSCFs to the UE during registration.

As described, for example, in the 3GPP TS, several mechanisms exist for a core-initiated P-CSCF restoration in which the IMS reassigns a UE to a different P-CSCF when a failure in a P-CSCF is detected. For example, the PGW may forward an update bearer request notification that identifies active P-CSCFs (e.g., excludes a failed P-CSCF), and the UE re-registers with one of the identified P-CSCFs. However, in certain instances, connection issues between the UE and the IMS may be unrelated to a faulty P-CSCF, and restoration of the P-CSCF may not solve the connection issues. Furthermore, there may be a delay before a P-CSCF failure is detected by the IMS, and the UE will be unable to connect to the IMS to establish the IMS call or access multimedia content until the failure is detected in the IMS and a P-CSCF restoration process is implemented.

BRIEF DESCRIPTION OF THE DRAWINGS

FIGS. 1A-1E are diagrams illustrating an exemplary environment according to implementations described herein;

FIG. 2 is a diagram illustrating an exemplary wireless environment according to an implementation described herein;

FIGS. 4A and 4B are flowcharts of an exemplary process for recovering from a failed P-CSCF in the environment of FIGS. 1A-1E and FIG. 2;

FIG. 5 is a flowchart of an exemplary process for handling an "End Call" input in the environment of FIGS. 1A-1E and FIG. 2; and FIG. 6 is a flowchart of an exemplary process when an IMS call is not successfully established during a threshold time period in the environment of FIGS. 1A-1E and FIG. 2.

DETAILED DESCRIPTION OF PREFERRED EMBODIMENTS

Figure 1C:
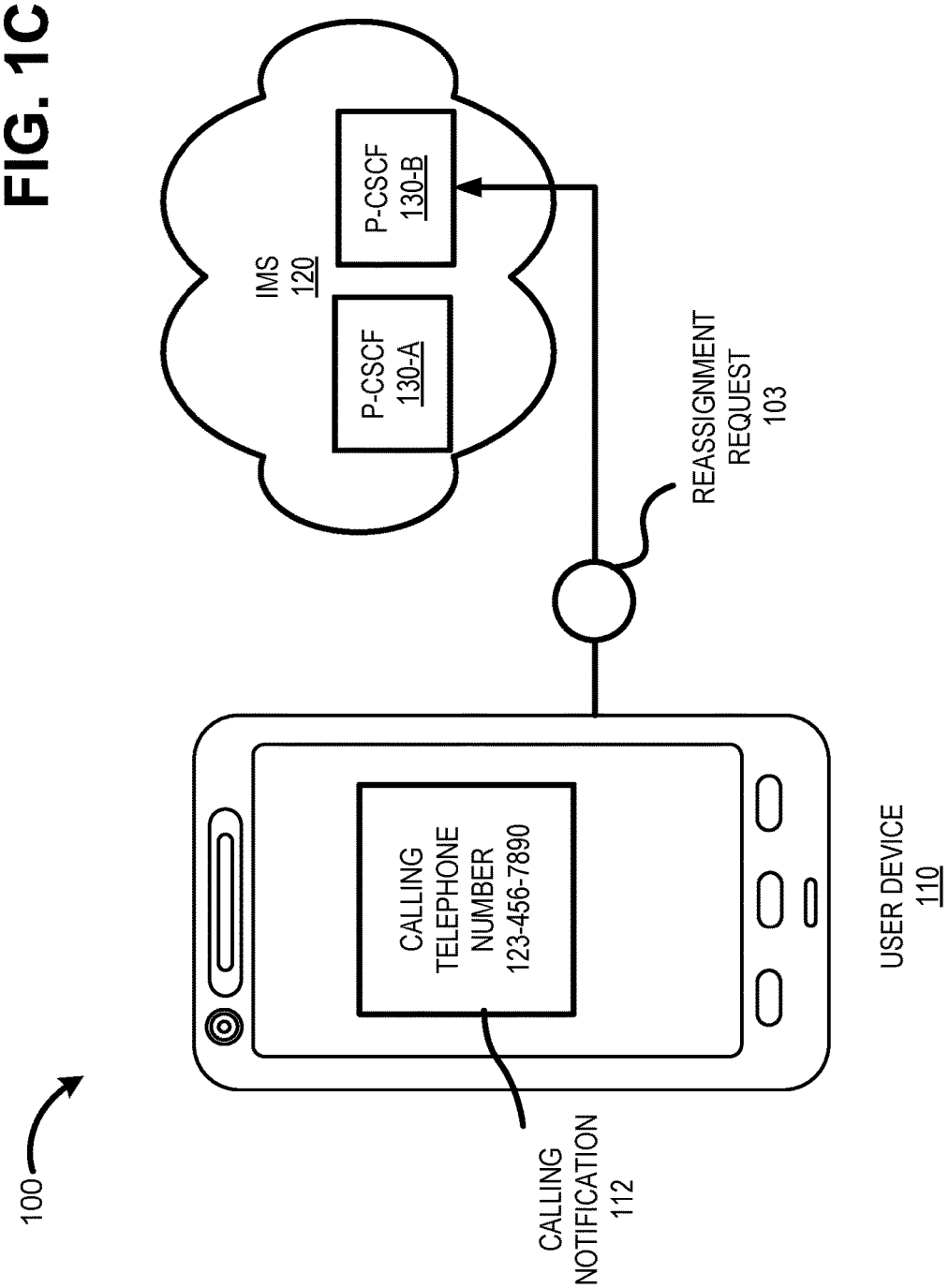

The following detailed description refers to the accompanying drawings. The same reference numbers in different drawings identify the same or similar elements.

FIGS. 1A-1E are diagrams showing an exemplary environment 100 in which systems and/or methods described herein may be implemented according to certain implementations. As shown in FIGS. 1A-1E, environment may include a user device 110, an Internet protocol (IP) multimedia subsystem (IMS) 120, and proxy-call session control function devices (P-CSCFs) 130 (shown in FIGS. 1A-1E as P-CSCFs 130-A and 130-B).

User device 110 may exchange data via IMS 120. As shown in FIG. 1A, user device 110 may forward a registration request 101 to IMS 120 to be assigned to one of the P-CSCFs 130 associated with IMS 120. User device 110 may register with IMS 120, for example, when user device 110 is activated, attempts to connect to IMS 120, performs an action to exchange data via IMS 120, initiates a VoIP telephone call, etc. In one example, user device 110 may correspond to a radio telephone or other wireless communications device. In another example, user device 110 may correspond to a computing device (e.g., a laptop or tablet computer, a wearable computer, etc. with a wireless data interface) capable of wireless data transmissions, but does not support a circuit -switched channel, such as a one times radio transmission technology (1×RTT or 1×) channel.

Registration request 101 may include, for example, data identifying user device 110, such as a mobile device number (MDN), a mobile subscriber identification number (MSIN), an international mobile subscriber identity (IMSI), a temporary mobile subscriber identity (TMSI), a media access control (MAC) address, an internet protocol (IP) address, an international mobile station equipment identity (IMEI) for mobile devices, a mobile equipment identifier (MEID), a universally unique identifier (UUID) for non-mobile devices, such as devices that communicate using short range communications protocols, such as Wi-Fi or Bluetooth®.

While registering with IMS 120, user device 110 may present for display (e.g., on a display included or connected to user device 120) a registration notification message 111 (shown in FIG. 1A as "Connecting to Network"), and user device 110 may be unable to access IMS 120 to place a VoIP call until the registration is completed and a P-CSCF 130 is assigned to user device 110.

IMS 120 may include an architectural framework or network (e.g., a telecommunications network) for delivering IP multimedia services. When registration request 101 is received, IMS 120 may identify active P-CSCFs 130, such as P-CSCFs forwarding messages through IMS 120 during a threshold time period. IMS 120 may forward data identifying one or more of the active P-CSCFs 130 to user device 110. For example, IMS 120 may assign user device 110 to one of the active P-CSCFs 130 (e.g., to P-CSCF 130-A) and further identify alternative active P-CSCFs 130 (e.g., P-CSCF 130-B). As described below, user device 110 may register with one of the alternative P-CSCFs 130 when a VoIP call request is unsuccessful.

P-CSCF 130 may function to provide subscriber authentication and security between user device 110 and IMS 120. P-CSCF 130 may function as a proxy server for user device 110 to exchange session initiation protocol (SIP) signaling traffic to/from IMS 120. P-CSCF 130 may also include or function as a Policy Decision Function device (PDF) to authorize media plane resources e.g., quality of service (QoS) over the media plane for policy control, bandwidth management, etc. P-CSCF 130 may also generate charging records related to user device 110 accessing IMS 120, such as to charge a user for a VoIP call.

As shown in FIG. 1B, user device 110 may forward a SIP invite message 102 (shown in FIG. 1B as SIP invite message 102-A) to initiate a VoIP call. For example, after successfully registering with IMS 120 based on registration request 101, user device 110 may present a graphical user interface (GUI), such as a virtual keypad, to receive a user input to identify a telephone number or other information identifying another device (e.g., another user device 110) to be called by user device 110, and user device 110 may forward SIP invite message 102 based on receiving the input. SIP invite message 102 may include data identifying the other device and may direct assigned P-CSCF 130-A to establish a session between user device 110 and the other device for the VoIP call.

As further shown in FIG. 1B, user device 110 may present a calling notification 112 (shown in FIG. 1B as "Calling Telephone Number 123-456-7890") in connection with forwarding SIP invite message 102. Calling notification 112 may indicate to an associated user that user device 110 is attempting to establish the VoIP call with the other device.

If SIP invite message 102-A is successfully handled by P-CSCF 130-A (e.g., P-CSCF 130-A establishes a session between user device 110 and another device), user device 110 may place the VoIP call using the established session.

If SIP invite message 102-A is not successfully handled by P-CSCF 130-A during a threshold time period, and user device 110 does not detect a failure in P-CSCF 130-A, user device 110 may again direct the assigned P-CSCF 130-A to establish the session for the VoIP call. For example, user device 110 may resend SIP invite 102-A to P-CSCF 130-A. In certain implementations, user device 110 may resend SIP invite 102-A to P-CSCF 130-A via a different base station and/or communications channel.

In one example, user device 110 may continue to present calling notification 112 while resending SIP invite 102-A to P-CSCF 130-A to inform an associated user that user device 110 is still trying to place the VoIP call.

If user device 110 detects a failure in its assigned P-CSCF 130-A, user device 110 may attempt to register with alternative P-CSCF 130-B (e.g., another P-CSCF 130 identified by IMS 120 when registering with P-CSCF 130-A). As shown in FIG. 1C, user device 110 may forward a reassignment request 103 to alternative P-CSCF 130-B. For example, user device 110 may forward reassignment request 103 when (1) an error message is assigned from P-CSCF 130-A or another component of IMS 120; (2) a response and/or acknowledgement of SIP invite 102 is not received from its assigned P-CSCF 130-A within a first threshold time period after transmitting SIP invite 102; and/or (3) P-CSCF 130-A does not establish the requested session during a second threshold time period after transmitting SIP invite 102. Reassignment request 103 may include, for example, data identifying user device 110 and/or an associated user and a request for user device 120 to be handled by alternative P-CSCF 130-B. Additionally or alternatively, reassignment request 103 may include data notifying IMS 120 of a failure of P-CSCF 130-A and/or a request for P-CSCF restoration.

Alternative P-CSCF 130-B may be assigned to user device 110 if, for example, P-CSCF 130-B has capacity (e.g., P-CSCF 130-B is operating and is handling less than a threshold number of other user devices 110). If P-CSCF 130-B cannot be assigned to user device 110 (e.g., forwards an error message) and/or does not respond to reassignment request 103 during a threshold time period, user device 110 may forward reassignment request 103 to a different P-CSCF 130 (not shown).

As shown in FIG. 1C, user device 110 may continue to present calling notification 112 while forwarding reassignment request 103 to P-CSCF 130-B to notify an associated user that user device 110 is still trying to place the VoIP call.

If user device 110 is successfully assigned to alterative P-CSCF 130-B, user device 110 may attempt to establish the VoIP call via P-CSCF 130-B. As shown in FIG. 1D, user device 110 may forward a SIP invite message 102 (shown in FIG. 1D as SIP invite message 102-B) to initiate a VoIP call via P-CSCF 130-B. For example, user device 110 may forward SIP invite message 102-B to P-CSCF 130-B based on receiving an acceptance from P-CSCF 130-B (or another component of IMS 120) of reassignment request 103. SIP invite message 102-B may include, for example, data identifying another device for the VoIP call and may direct P-CSCF 130-B to establish a session between user device 110 and the other device.

As shown in FIG. 1D, user device 110 may continue to present calling notification 112 while forwarding SIP invite message 102-B to P-CSCF 130-B to notify an associated user that user device 110 is still trying to place the VoIP call.

As shown in FIG. 1E, user device 110 may present a call failure notification 113 (shown in FIG. 1E as "Call Failed) in certain instances. As further shown in FIG. 1E, user device 110 may present call failure notification 113 when an error message 104 is received from IMS 120 and/or P-CSCF 130 that the registration and/or SIP initiation failed. Error message 104 may indicate a failure in IMS 120 and/or another component in a path between user device 110 and a called device. In another example, user device 110 may present call failure notification 113 when the user submits an input to end the call. In another example, user device 110 may present call failure notification 113 when more than a threshold amount of time (e.g., more than five seconds) has passed since a user input (e.g., via a GUI) was received by user device 110 to initiate a call and/or user device 110 forwarded SIP invite 102-A to establish the call.

Although FIGS. 1A-1E show exemplary components of environment 100, in other implementations, environment 100 may include fewer components, different components, differently arranged components, or additional components than depicted in FIGS. 1A-1E. Additionally or alternatively, one or more components of environment 100 may perform functions described as being performed by one or more other components of environment 100.

FIG. 2 is a diagram of an example wireless environment 200 in which systems and/or methods described herein may be implemented. As illustrated, wireless environment 200 may include a UE 210, a LTE network 220, an EPC network 230, an IMS 120, and an authentication, authorization, accounting (AAA) server 240. LTE network 220 may include an eNB 222. EPC network 230 may include a mobility management entity (MME) 232, a serving gateway (SGW) 234, a policy and charging rule function (PCRF) device 236, and a packet data network (PDN) gateway (PGW) 238. IMS 120 may include P-CSCF 130. Devices/networks of wireless environment 200 may interconnect via wired and/or wireless connections.

As further shown in FIG. 2, eNB 222 may interface with MME 232 over a S1-MME interface, and may interface with SGW 234 over a S1-U interface. MME 232 may interface with SGW 234 over a S11 interface. SGW 234 may interface with PGW 238 over a S5 interface. PCRF 236 may interface with PGW 238 over a Gx interface. PCRF 236 may interface with P-CSCF 130 over an Rx interface. PGW 238 may interface with AAA server 240 over a S6b interface. Other interfaces not shown in FIG. 2 may also be utilized by devices of LTE network 220, EPC network 230, and/or IMS 120. For example, multiple MMES 232 may interface with one another over S10 interfaces.

UE 210 may correspond to user device 110. UE 210 may include, for example, a smart phone; a personal data assistant (PDA) that can include a radiotelephone, a pager, Internet/intranet access, etc.; a laptop computer; a tablet computer; a wearable computer (e.g., a smart watch, smart glasses, etc.), an Internet of things (IOT) device, a desktop computer, a workstation computer; a personal computer; a landline telephone; or other types of computation and communication devices. In one implementation, UE 210 may include a device that is capable of communicating over LTE network 220, EPC network 230, and/or IMS 120.

LTE network 220 may include a communications network that connects subscribers (e.g., UE 210) to a service provider. In one example, LTE network 220 may include a wireless local area network (WLAN) or other access networks (e.g., an E-UTRAN or an enhanced high-rate packet data (eHRPD) network). Alternatively, or additionally, LTE network 220 may include a radio access network capable of supporting high data rate, low latency, packet optimization, large capacity and coverage, etc.

eNB 222 may include one or more computation and communication devices, such as a base station, that receive traffic from MME 232 and/or SGW 234 and transmit that traffic to UE 210. eNB 222 may also include one or more devices that receive traffic from UE 210 and transmit that traffic to MME 232 and/or SGW 234 or to other UEs 210. eNB 222 may combine the functionalities of a base station and a radio network controller (RNC) in 2G or 3G radio access networks.

EPC network 230 may include a core network architecture of the 3GPP LTE wireless communication standard. In one example. EPC network 230 may include an IP packet-switched core network that supports high-speed wireless and wireline broadband access technologies. In another example, EPC network 230 may provide packet-switched voice services (e.g., which are traditionally circuit-switched) using IMS 120.

MME 232 may include one or more computation and communication devices that may be responsible for idle mode tracking and paging procedures (e.g., including retransmissions) for UE 210. MME 232 may be involved in a bearer activation/deactivation process (e.g., for UE 210) and may choose a SGW for UE 210 at an initial attach and at a time of intra-LTE handover. MME 232 may authenticate UE 210. Non-access stratum (NAS) signaling may terminate at MME 232 and MME 232 may generate and allocate temporary identities to UEs (e.g., UE 210). MME 232 may check authorization of UE 210 to utilize a service provider's Public Land Mobile Network (PLMN) and may enforce roaming restrictions for UE 210. MME 232 may be a termination point in EPC network 230 for ciphering/integrity protection for NAS signaling and may handle security key management. MME 232 may provide a control plane function for mobility between LTE and access networks with a S3 interface terminating at MME 232.

SGW 234 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic. In one example, SGW 234 may route and forward user data packets, may act as a mobility anchor for a user plane during inter-eNB handovers, and may act as an anchor for mobility between LTE and other 3GPP technologies. For idle state UEs 210, SGW 234 may terminate a downlink data path and may trigger paging when downlink data arrives for UE 210. SGW 234 may manage and store contexts associated with UE 210 (e.g., parameters of an IP bearer service, network internal routing information, etc.).

PCRF 236 may include one or more computation and communication devices that provide policy control decision and flow based charging control functionalities. PCRF 236 may provide network control regarding service data flow detection, gating, quality of service (QoS) and flow based charging, etc. PCRF 236 may determine how a certain service data flow shall be treated, and ensure that user plane traffic mapping and treatment is in accordance with a user's subscription profile.

PGW 238 may include one or more traffic transfer devices (or network devices), such as a gateway, a router, a switch, a firewall, a NIC, a hub, a bridge, a proxy server, an OADM, or some other type of device that processes and/or transfers traffic. In one example, PGW 238 may provide connectivity of UE 210 to external packet data networks by being a traffic exit/entry point for UE 210. UE 210 may simultaneously connect to more than one PGW 238 for accessing multiple PDNs. PGW 238 may perform policy enforcement, packet filtering for each user, charging support, lawful intercept, and packet screening. PGW 238 may also act as an anchor for mobility between 3GPP and non-3GPP technologies.

AAA server 240 may include one or more computation and communication devices that provide authentication, authorization, and accounting services for UE 210. With regard to authentication, AAA server 240 may verify an identifier (e.g., a mobile directory number (MDN), a mobile identification number (MIN), a mobile equipment identity (MEID), an IMEI, etc.) and credentials (e.g., passwords, tokens, digital certificates, etc.) associated with UE 210. With regard to authorization, AAA server 240 may grant or refuse privileges to UE 210 for accessing specific services. With regard to accounting, AAA server 240 may track consumption of network resources by UE 210.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of wireless environment 200 may perform one or more functions described as being performed by one or more other devices of wireless environment 200.

Figure 3:
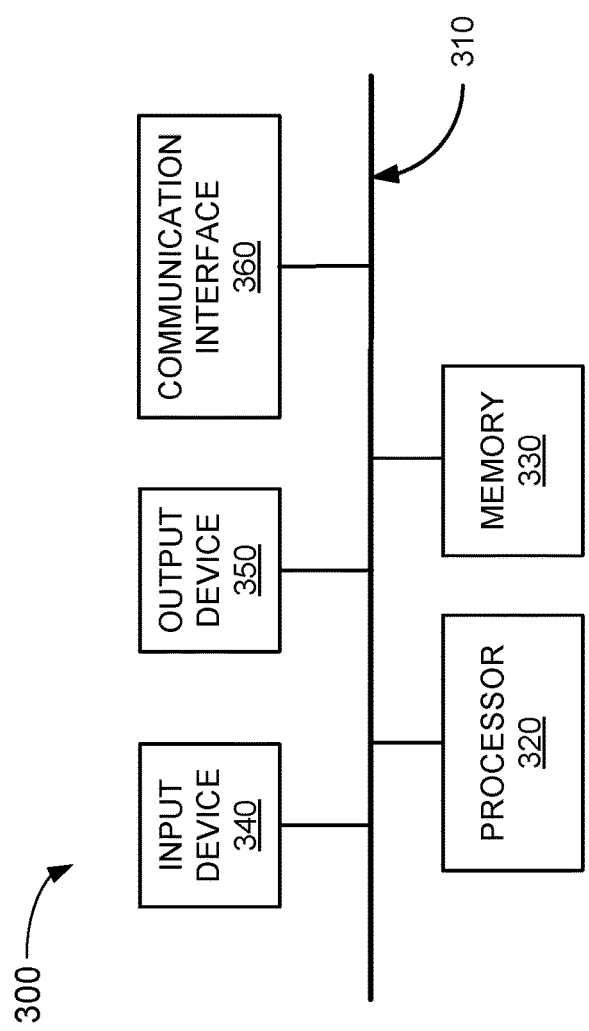
FIG. 3 is a diagram illustrating exemplary components of a computing device that may be included in the environment of FIGS. 1A-1E and FIG. 2.

FIG. 3 is a diagram illustrating exemplary functional components of computing device 300 according to an implementation described herein. User device 110, a component of IMS 120, P-CSCF 130, or a component of wireless environment 200 may each include one or more devices 300. As shown in FIG. 3, computing device 300 may include a bus 310, a processor 320, a memory 330, an input device 340, an output device 350, and a communication interface 360.

Bus 310 may include a path that permits communication among the components of computing device 300. Processor 320 may include any type of single-core processor, multi-core processor, microprocessor, latch-based processor, and/ or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into computing device 300. Input device 340 may include, for example, a keyboard, a mouse, a pen, a microphone, a remote control, an audio capture device, an image and/or video capture device, a touch-screen display, and/or another type of input device. In some embodiments, computing device 300 may be managed remotely and may not include input device 340. In other words, computing device 300 may be "headless" and may not include a keyboard, for example.

Output device 350 may output information to an operator of computing device 300. Output device 350 may include a display, a printer, a speaker, and/or another type of output device. For example, computing device 300 may include a display, which may include a liquid-crystal display (LCD) for displaying content to the customer. In some embodiments, computing device 300 may be managed remotely and may not include output device 350. In other words, computing device 300 may be "headless" and may not include a display, for example.

Communication interface 360 may include a transceiver that enables computing device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth® wireless interface, a radio-frequency identification (RFID) interface, a near-field communications (NFC) wireless interface, and/or any other type of interface that converts data from one form to another form.

Computing device 300 may perform certain operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of computing device 300, in other implementations, computing device 300 may include fewer components, different components, additional components, or differently arranged components than those depicted in FIG. 3. Additionally or alternatively, one or more components of computing device 300 may perform one or more tasks described as being performed by one or more other components of computing device 300.

FIGS. 4A and 4B are flowcharts depicting an exemplary process 400 for handling a potential failure of P-CSCF 130 in connection with establishing a VoIP call via IMS 120 according to an implementation described herein. In some implementations, process 400 may be performed by user device 110. In other implementations, some or all of process 400 may be performed by another device or a group of devices separate from and/or including user device 110, such as one of the components of wireless environment 200 shown in FIG. 2.

As shown in FIG. 4A, process 400 may include user device 110 registering with a P-CSCF 130 (block 401). As previously described with respect to FIG. 1A, user device 110 may forward registration request message 101 to IMS 120 to be assigned to P-CSCF 130. Additionally, IMS 120 may forward data to user device 110 identifying one or more alternative P-CSCFs 130 based on user device 110 forwarding registration request message 101 or other communication (e.g., a connection request to eNB 222). Process 400 may further include user device 110 determining to make an IMS call, such as a VoIP, video, TTY or other type of call (block 402). For example, user device 110 may receive an input from a user requesting the call. In another example, user device 110 may include logic (e.g., an application) that causes the IMS call to be initiated without a user input. For instance, user device 110 may automatically initiate an IMS call to technical support number when a malfunction is detected or other circumstances are detected (e.g., such as an emergency situation).

As shown in FIG. 4A, process 400 may include user device 110 forwarding a SIP invite to the registered P-CSCF 130 (block 410). For example, as described with respect to FIG. 1B, user device 110 may forward SIP invite message 102 to its assigned P-CSCF 130 to request P-CSCF 130 to establish a session between user device 110 and another device for the IMS call. The contents of a SIP invite request message 102 used for initiating/originating a call is described, for example, in Internet Engineering Task Force (IETF) Request for Comments (RFC) 3261.

User device 110 may determine whether a response is received during a first time period after initiating the IMS call (block 420). For example, user device 110 may determine whether the assigned P-CSCF 130 forwards an acknowledgement message indicating that P-CSCF 130 has received and/or is processing the SIP invite sent in block 410. In another example, user device 110 may determine whether the assigned P-CSCF 130 forwarded a message indicating that the session was established to the called (or destination) device during the first time period (e.g., within 5 seconds of forwarding the SIP invite message 102).

When user device 110 does not receive a response to the SIP invite during the first time period (e.g., within S seconds, such as two seconds after initiating the VoIP call), this may indicate an error in P-CSCF 130 and/or in a connection between user device 110 and another components of wireless environment 200. For example, user device 110 may not receive a response if (1) user device 110 loses connectivity to LTE network 220; (2) user device 110 fails to establish a connection (e.g., a Transmission Control Protocol (TCP) connection) with P-CSCF 130; (3) SIP invite message 102 is lost before reaching P-CSCF 130; (4) the response (e.g., a SIP 1xx response message) from P-CSCF 130 is lost; or (5) a failure occurs in IMS 120 and/or P-CSCF 130.

The first time period may vary in different wireless environments 200. During the first time period, user device 110 may retransmit SIP invite 102 message. For example, as described in IETF RFC 3261, user device 110 may re-forward SIP invite 102 after a first time (T1), double the first time (2*T1), quadruple T1 (4*T1), etc., when an relatively unreliable transport protocol (such as user datagram protocol (UDP)) is used to forward SIP invite 102.

If user device 110 determines that a response is received from P-CSCF 130 during the first time period (block 420-Yes), user device 110 may determine whether the response is a server failure response (block 430). For example user device 110 may determine whether the response corresponds to an error message from P-CSCF 130 indicating that it is no longer functioning and/or unable to establish the requested session for the VoIP call. In another example, user device 110 may receive, in block 430, an error message identifying a fault in IMS 120, LTE network 220, and/or EPC network 230. If user device 110 receives a service failure response or other error message after sending the SIP invite message 102 (block 430-Yes), user device 110 may attempt a new registration with a different P-CSCF 130 (e.g., another P-CSCF 130 associated with IMS 120 and/or a P-CSCF 130 associated with a different IMS 120), as described below with respect to block 480. Otherwise, if the response received in block 420 is not an error message (block 430-No), user device 110 may apply a normal (e.g., standard) call handling procedure (block 403). For example, user device 110 attempt to establish the IMS call via a session initiated by P-CSCF 130 in response to the SIP invite forwarded in block 410.

Referring now to FIG. 4B, if user device 110 does not receive a response from P-CSCF 130 during the first time period (block 420-No), user device 110 may attempt to register with the old P-CSCF 130 (e.g., a P-CSCF 130 to which user device 110 is previously registered) or a new P-CSCF 130 (block 440). For example, user device 110 may forward a message, such as assignment request 102, to the old/new P-CSCF 130 and/or another component of IMS 120. The message sent in block 450 may cause user device 110 to have new assignment to the old/new P-CSCF 130. For example, IMS 120 may generate new records associating user device 110 with the old/new P-CSCF 130. A new IMS registration over-writes the previous IMS registration (if any) in P-CSCF 130, which could also clear any issues within P-CSCF 130 that might be preventing P-CSCF 130 from communicating with user device 110.

In one implementation, user device 110 may, before performing a new registration with a new/old P-CSCF 130 in block 440, determine whether user device 110 is participating in another VoIP call via P-CSCF 130. If user device 110 is participating in another VoIP call via P-CSCF 130 or another component of IMS 120 (e.g., another P-CSCF 130), user device 110 may wait until the other call is completed before starting a new registration with the new/old P-CSCF 130. Otherwise, the other call will be dropped when user device 110 attempts a new registration with the old/new P-CSCF 130.

User device 110 may determine whether the new registration with the old/new P-CSCF-130 in block 450 is successful (block 450). For example, user device 110 may receive a message from IMS 120 indicating that user device 110 is registered with P-CSCF 130. If user device 110 successfully registers with the old/new P-CSCF-130 (block 450-Yes), user device 110 may forward a SIP invite message to the old/new P-CSCF 130 (block 460) and determine whether a response to the SIP invite message is received from the old/new P-CSCF 130 during the first time period (e.g., X seconds) after initiating the call and/or sending the SIP Invite (block 470). The operation of user device 110 in blocks 460 and 470 may correspond, respectively, to the operation of user device 110 in blocks 410 and 420.

If user device 110 determines that a response to the new SIP invite is received during the first time period (block 470-Yes) and/or that the response is not a server failure response as described above with respect to block 430, user device 110 may place the call via the session, as described above with respect to block 403. Otherwise, if user device 110 determines that a response to the new SIP invite (sent in block 460) is not received during the first time period (block 470-No), user device 110 may abort the call (if not already aborted) and declare a call failure (block 475). For example, user device 110 may determine that a failure in IMS 120 and/or other component of wireless environment 200, which differs from P-CSCF 130, is preventing the IMS call. User device 110 may perform certain actions based on detecting the network fault, such as attempting to connect to a different eNB 222 and/or a different IMS 120. User device 110 may further present a graphical indication that the call could not be placed and/or directing the user to re-attempt the call at a future time. For example, user device 110 may direct the user to re-attempt the call when user device 110 connects to a different eNB 222 and/or a different IMS 120.

If the new IMS registration with the old/new P-CSCF 130 is not successful (block 450-No), user device 110 may determine whether another P-CSCF 130 is known (block 480). For example, user device 110 may determine whether one or more other P-CSCFs 130 were identified by IMS 120 when user device 100 initially registered with the original P-CSCF 130. In another example, user device 110 may perform discovery of P-CSCF 130 within wireless environment 200, such as forwarding a registration request. If no other P-CSCFs 130 are known (block 480-No), user device 110 may abort the call (if the call was not previously aborted) and declare the call a failure in block 467. For example, user device 110 may abort the call if user device 110 unsuccessfully attempts to register with all P-CSCFs 130 identified by IMS 120 as allegedly being available. For example, user device 110 may present a graphical indication that the call could not be placed. In one example, when the call ends, user device 110 may continue to attempt to register with P-CSCF 130 or an alternative P-CSCF 130 after the call is aborted.

Otherwise, if user device 110 knows other possible P-CSCFs 130 to possibly register with (block 480-Yes), user device 110 may attempt to register with one of the other known P-CSCFs 130 (block 490). For example, as described above with respect to blocks 401 and 440, user device 110 may forward a registration request to another known P-CSCF 130. As shown in FIG. 4B, process 400 may return to block 450, user device 110 may determine whether the registration with the new P-CSCF 130 is successful and user device 110 may continue to attempt new registrations with different P-CSCFs 130 until user device 110 has unsuccessfully attempted to register with all known P-CSCF 130 associated with IMS 120.

FIG. 5 is a flowchart of an exemplary process for handling an "End Call" input received by user device 110. In some implementations, process 500 may be performed by user device 110. In other implementations, some or all of process 500 may be performed by another device or a group of devices separate from and/or including user device 110, such as one of the other components of wireless environment 200 shown in FIG. 2.

As shown in FIG. 5, process 500 may include receiving an "End Call" input (block 510). At any time in process 400 after initiating the IMS call in block 402, user device 110 may abort the call if an associated user requests to end the call. For example, user device 110 may determine whether the associated user submits an input (e.g., selects an "End Call" option) to end the IMS call. In another example, the "End Call" input may be triggered by an automatic process within user device 110. For example, the "End Call" input may be automatically triggered if battery power reserves within user device 110 are below a threshold level or when user device 110 is being used in a manner that does not permit the IMS call (e.g., the associated user is driving). The call is aborted based on receiving the input, and user device 110 may present a visual indication that the call is ended (block 520).

As shown in FIG. 5, user device 110 may determine whether the "End Call" input is received during the first time period and before a response is received (block 530). For example, user device 110 may determine whether the "End Call" input is received while trying to establish the session through an existing registration with a given P-CSCF 130. When the "End Call" input is received during the first time period and before a response is received (block 530-Yes) or if the "End Call" input is received while normal call handling procedures are being applied in block 403, user device 110 may continue with the existing IMS registration with the given P-CSCF 130)

Otherwise, when the "End Call" input is received when a response is not received during the first time period (block 530-No, user device 110 may continue to perform a new IMS registration with the P-CSCF 130 or other another P-CSCF 130 identified by IMS 120, as described in blocks 440-490 of process 400 (block 550). In another example, user device 110 may perform the new IMS registration with other another P-CSCF 130 identified by IMS 120 when the "End Call" input is received after a server error response is received in block 430. In this way, user device 110 may establish a new and valid registration with one of the P-CSCFs 130 within wireless environment 200 when user device 110 accesses IMS 120 at a later time, such as to place a future IMS call. This enables the later call to be placed more reliably and with less delay.

FIG. 6 is a flowchart of an exemplary process when an IMS call is not successfully established during a threshold time period. In some implementations, process 600 may be performed by user device 110. In other implementations, some or all of process 600 may be performed by another device or a group of devices separate from and/or including user device 110, such as one of the other components of wireless environment 200 shown in FIG. 2.

As shown in FIG. 6, user device 110 may determine when a second time period has passed since initiating the IMS call (block 610). The second time period is typically longer than the first time period evaluated in block 420. For example, the second time period may range from 3-10 seconds. The purpose of the second time period (Y seconds) is to not continue to show the "Dialing" message on the screen for too long. When the second time period has expired since initiating the IMS call in block 610, user device 110 may abort the call and present an indication of a call failure (block 620). For example, as shown in FIG. 1E, user device 110 may present a call failure notification 113. As shown in FIG. 6, user device may attempt a new IMS registration (block 630) when the second time period has expired since initiating the IMS call. When the second time period has passed, user device 110 may continue to search for a good/working P-CSCF 130 until all known P-CSCFs have been exhausted. For example, as described above with respect to blocks 480 and 490 of process 400, user device 110 may identify another known P-CSCF 130 and may attempt to register with the other P-CSCF 130 until new registration is successful or user device 110 has attempted to register with all known P-CSCFs 130. In this way, user device 110 may establish a new and valid registration with the another P-CSCFs 130 within wireless environment 200 so user device 110 may access IMS 120 at a later time to retry the IMS call or to place another IMS call.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks have been described with respect to processes 400, 500, and 600 in FIGS. 4A, 4B, 5, and 6, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
forwarding, by a processor associated with a user device, a registration request to an Internet protocol (IP) multimedia subsystem (IMS) to assign the user device to a proxy-call session control function device (P-CSCF) associated with the IMS;
receiving, at the processor, information identifying a plurality of P-CSCFs including the P-CSCF;
forwarding, by the processor, a message to the P-CSCF requesting a session via the IMS for an IMS call;
determining, by the processor, that a response to the message is not received from the P-CSCF during a particular time period;
registering, by the processor and based on determining that the response is not received during the particular time period, the user device with a second P-CSCF of the plurality of P-CSCFs; and
sending, by the processor, the message to the second P-CSCF based on registering the user device with the second P-CSCF.

2. The method of claim 1, further comprising:
declaring a call failure when a response to the message to the second P-CSCF is not received from the second P-CSCF during a second time period.

3. The method of claim 1, further comprising:
re-forwarding the message to the P-CSCF requesting the session via the IMS during the particular time period.

4. The method of claim 1, further comprising:
receiving an error message during the particular time period; and
registering the user device with the second P-CSCF in response to receiving the error message.

5. The method of claim 1, wherein the message is a session initiation protocol (SIP) invite message.

6. The method of claim 1, wherein a length of the particular time period varies based on a wireless environment associated with the message.

7. The method of claim 1, wherein the response to the message includes an acknowledgment message indicating that the P-CSCF has received and is processing the message.

8. A device comprising:
a memory to store instructions; and
a processor configured to execute one or more of the instructions to:
forward a registration request to an Internet protocol (IP) multimedia subsystem (IMS) to assign the device to a proxy-call session control function device (P-CSCF) associated with the IMS;
receive information identifying a plurality of P-CSCFs including the P-CSCF;
forward a message to the P-CSCF requesting a session via the IMS for an IMS call;
determine that a response to the message is not received from the P-CSCF during a particular time period;
register, based on determining that the response is not received during the particular time period, the device with a second P-CSCF of the plurality of P-CSCFs; and
send the message to the second P-CSCF based on registering the device with the second P-CSCF.

9. The device of claim 8, wherein the processor is further configured to:
declare a call failure when a response to the message to the second P-CSCF is not received from the second P-CSCF during a second time period.

10. The device of claim 8, wherein the processor is further configured to:
re-forward the message to the P-CSCF requesting the session via the IMS during the particular time period.

11. The device of claim 8, wherein the processor is further configured to:
receive an error message during the particular time period; and
register the device with the second P-CSCF in response to receiving the error message.

12. The device of claim 8, wherein the message is a session initiation protocol (SIP) invite message.

13. The device of claim 8, wherein a length of the particular time period varies based on a wireless environment associated with the message.

14. The device of claim 8, wherein the response to the message includes an acknowledgment message indicating that the P-CSCF has received and is processing the message.

15. A non-transitory computer-readable medium configured to store instruction, the instructions comprising:
one or more instructions that, when executed by a processor associated with a device, cause the processor to:
forward a registration request to an Internet protocol (IP) multimedia subsystem (IMS) to assign the device to a proxy-call session control function device (P-CSCF) associated with the IMS;
receive information identifying a plurality of P-CSCFs including the P-CSCF;
forward a message to the P-CSCF requesting a session via the IMS for an IMS call;
determine that a response to the message is not received from the P-CSCF during a particular time period;
register, based on determining that the response is not received during the particular time period, the device with a second P-CSCF of the plurality of P-CSCFs; and
send the message to the second P-CSCF based on registering the device with the second P-CSCF.

16. The non-transitory computer-readable medium of claim 15, wherein the one or more instructions further cause the processor to:
declare a call failure when a response to the message to the second P-CSCF is not received from the second P-CSCF during a second time period.

17. The non-transitory computer-readable medium of claim 15, wherein the one or more instructions further cause the processor to:
re-forward the message to the P-CSCF requesting the session via the IMS during the particular time period.

18. The non-transitory computer-readable medium of claim 15, wherein the one or more instructions further cause the processor to:
receive an error message during the particular time period; and register the device with the second P-CSCF in response to receiving the error message.

19. The non-transitory computer-readable medium of claim 15, wherein the message is a session initiation protocol (SIP) invite message.

20. The non-transitory computer-readable medium of claim 15, wherein the response to the message includes an acknowledgment message indicating that the P-CSCF has received and is processing the message.

* * * * *